(12) United States Patent
Torii

(10) Patent No.: US 11,892,753 B2
(45) Date of Patent: Feb. 6, 2024

(54) LENS APPARATUS

(71) Applicant: CANON KABUSHIKI KAISHA, Tokyo (JP)

(72) Inventor: Shigehiro Torii, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 536 days.

(21) Appl. No.: 17/208,199

(22) Filed: Mar. 22, 2021

(65) Prior Publication Data

US 2021/0302806 A1 Sep. 30, 2021

(30) Foreign Application Priority Data

Mar. 30, 2020 (JP) ................... 2020-059996

(51) Int. Cl.
*G02B 7/02* (2021.01)
*G03B 17/14* (2021.01)
*G03B 17/56* (2021.01)
*H04N 23/55* (2023.01)
*G03B 17/04* (2021.01)

(52) U.S. Cl.
CPC ............ *G03B 17/14* (2013.01); *G02B 7/021* (2013.01); *G03B 17/04* (2013.01); *G03B 17/56* (2013.01); *H04N 23/55* (2023.01)

(58) Field of Classification Search
CPC ........... G03B 17/04; G02B 7/10; G02B 7/021
See application file for complete search history.

(56) References Cited

U.S. PATENT DOCUMENTS

| | | | | |
|---|---|---|---|---|
| 2,865,273 A | * | 12/1958 | Meixner | G03B 17/14 396/349 |
| 5,765,048 A | * | 6/1998 | Nomura | G03B 17/04 396/85 |
| 5,900,992 A | | 5/1999 | Kodaka | |
| 9,513,462 B2 | * | 12/2016 | Izumi | G02B 7/102 |

FOREIGN PATENT DOCUMENTS

| | | |
|---|---|---|
| JP | H0943655 A | 2/1997 |
| JP | 2000187145 A | 7/2000 |
| JP | 2005221889 A | 8/2005 |
| JP | 2018005129 A | 1/2018 |

* cited by examiner

*Primary Examiner* — Leon W Rhodes, Jr.
(74) *Attorney, Agent, or Firm* — ROSSI, KIMMS & McDOWELL LLP

(57) ABSTRACT

A lens apparatus includes a holding barrel configured to hold a lens, an operation member, an exterior barrel configured to hold the operation member rotatably around an optical axis, and a fixed barrel. When the holding barrel and the exterior barrel move in an optical axis direction relative to the fixed barrel, an imaging state and a retracted state are switchable. When the operation member is rotated in one direction in each of the imaging and retracted states, the operation member gets engaged with the fixed barrel and the state gets locked. When the operation member is rotated in the other direction around the optical axis, the operation member gets disengaged from the fixed barrel, and the imaging state or the retracted state gets unlocked and switchable.

12 Claims, 7 Drawing Sheets

LENS APPARATUS

BACKGROUND OF THE INVENTION

Field of the Invention

The present invention relates to a retractable lens apparatus.

Description of the Related Art

Some lens apparatuses are retractable when a movable part is moved in an optical axis direction relative to a fixed part. More specifically, an imaging state is made during imaging in which the movable part projects toward the object relative to the fixed part, and a retracted state (stored state) is made during non-imaging (while the lens apparatus is carried) in which the movable part is stored in the fixed part.

Japanese Patent Laid-Open No. ("JP") 9-43655 discloses a lens apparatus that is switchable between the imaging state and the retracted state by moving the front lens holding barrel relative to the rear lens holding barrel in the optical axis direction. This lens apparats includes a clamp (screw) that serves as a clamp member that clamps the front lens holding barrel relative to the rear lens holding barrel in each of the imaging state and the retracted state.

However, it is difficult for the lens apparatus disclosed in JP 9-43655 using the clamp, to fix the extended front unit to the fixed barrel while the optical axis of the front unit and the optical axis of the rear unit are aligned with each other, that is, while the optical performance of the lens apparatus is maintained. In addition, it is unclear how strongly the clamp is to be fastened, and thus the lens apparatus has low operability. Moreover, since the clamp projects in the radial direction of the lens apparatus, the lens apparatus becomes large.

SUMMARY OF THE INVENTION

The present invention provides a compact lens apparatus that can be locked to an imaging state and a retracted state by a simple user operation.

A lens apparatus according to one aspect of the present invention includes a holding barrel configured to hold a lens, an operation member, an exterior barrel configured to hold the operation member rotatably around an optical axis, and a fixed barrel. The holding barrel is integrally fixed to the exterior barrel, and when the holding barrel and the exterior barrel move in an optical axis direction relative to the fixed barrel, an imaging state and a retracted state in which an overall length is shorter than that of the imaging state are switchable. When the operation member is rotated in one direction around the optical axis in the imaging state, the operation member gets engaged with the fixed barrel and the imaging state gets locked. When the operation member is rotated in the one direction around the optical axis in the retracted state, the operation member gets engaged with the fixed barrel and the retracted state gets locked. When the operation member is rotated in the other direction around the optical axis, the operation member gets disengaged from the fixed barrel, and the imaging state or the retracted state gets unlocked and switchable.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
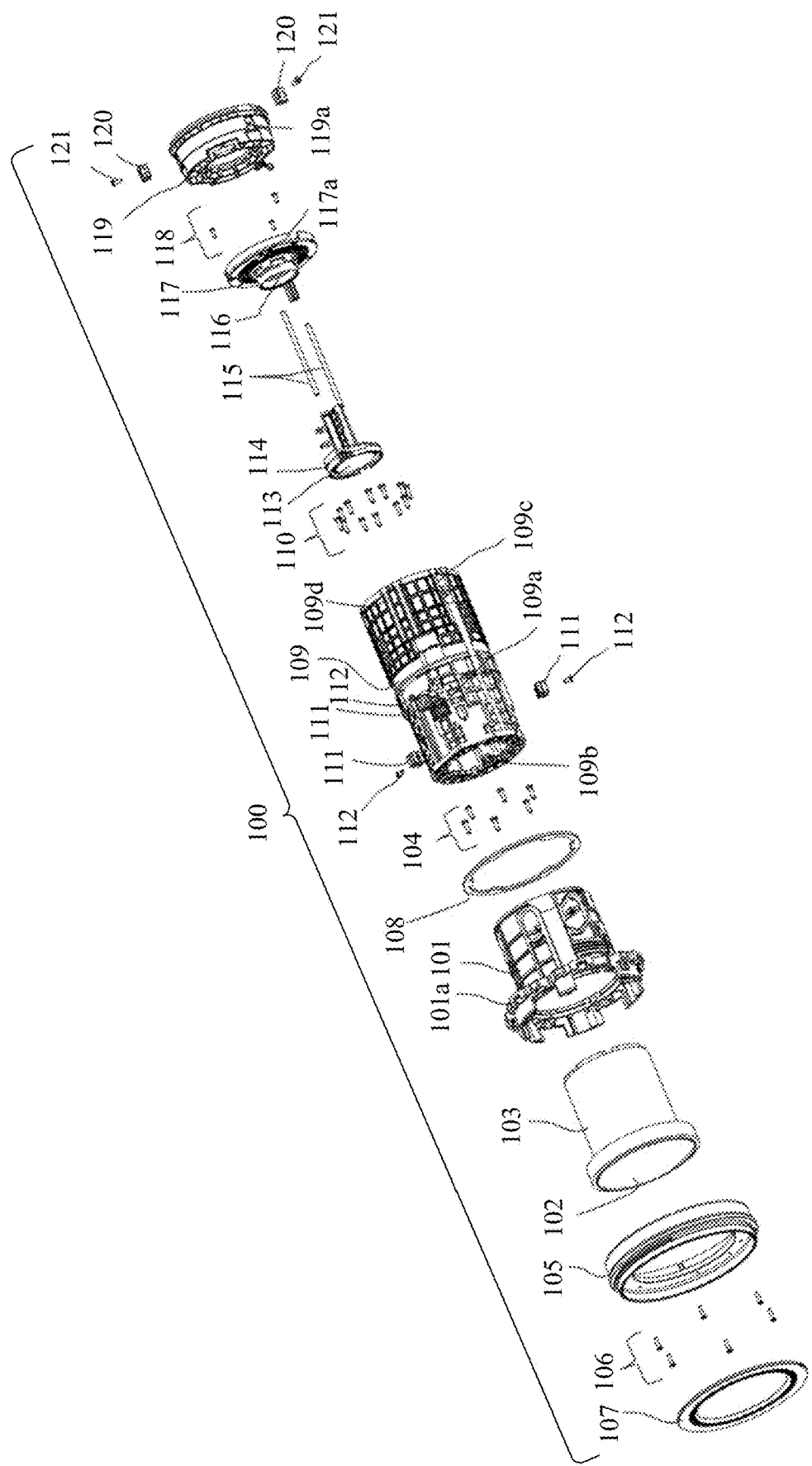
FIG. 1 is an exploded perspective view of a holding barrel unit in a lens apparatus according to a first embodiment of the present invention.

FIG. 1 illustrates a structure of a holding barrel unit 100 in a lens apparatus 500 (see FIGS. 4, 5A, and 5B) according to a first embodiment of the present invention. The lens apparatus 500 according to this embodiment is attachable to and detachable from an unillustrated lens interchangeable type image pickup apparatus. The image pickup apparatus includes an image sensor that captures an object image formed by an imaging optical system in the lens apparatus 500. In the following description, a direction in which an optical axis 400 of the lens apparatus 500 extends will be referred to as an optical axis direction, and a direction around the optical axis 400 will be referred to as a circumferential direction.

In the holding barrel unit 100, a first barrel 103 that holds a first lens 102 is fixed to a first holding barrel 101 by screws 104. A filter frame 105 is fixed to the first holding barrel 101 with screws 106, and a decorative ring 107 is fixed to a filter frame 105 by adhesion. A rubber ring 108 is fixed to the first holding barrel 101 by adhesion. The first holding barrel 101 has a connector 101a that is connected to an exterior barrel unit 300 described later.

A second holding barrel 109 is fixed to the first holding barrel 101 with screws 110. First guide rollers 111 are fitted into groove portions 109a provided in the outer circumference surface of the second holding barrel 109 and fixed by screws 112. The first guide roller 111 guides a movement of the holding barrel unit 100 in the optical axis direction relative to a fixed barrel unit 200 described later.

A second lens 113 as a focus unit is held by a second barrel 114. The second barrel 114 is guided movably in the optical axis direction by guide bars 115, and driven in the optical axis direction by an unillustrated focus actuator. The guide bar 115 is held while both of its ends are engaged with an engagement hole portion 109b provided in the second holding barrel 109 and an engagement hole portion 117a provided in the third barrel 117 that holds a third lens 116. The third barrel 117 is fixed to the second holding barrel 109 by screws 118. An imaging optical system includes the first lens 102, the second lens 113, and the third lens 116.

A reinforcing barrel 119 is held by the second holding barrel 109. After the reinforcing barrel 119 is incorporated into the second holding barrel 109, second guide rollers 120 are inserted into groove portions 119a provided in the outer circumference of the reinforcing barrel 119 through assembly hole portions 109c in the second holding barrel 109 and fixed to the reinforcing barrel 119 with screws 121. The second guide roller 120 guides a movement of the holding barrel unit 100 in the optical axis direction relative to the fixed barrel unit 200 described later.

Figure 2:
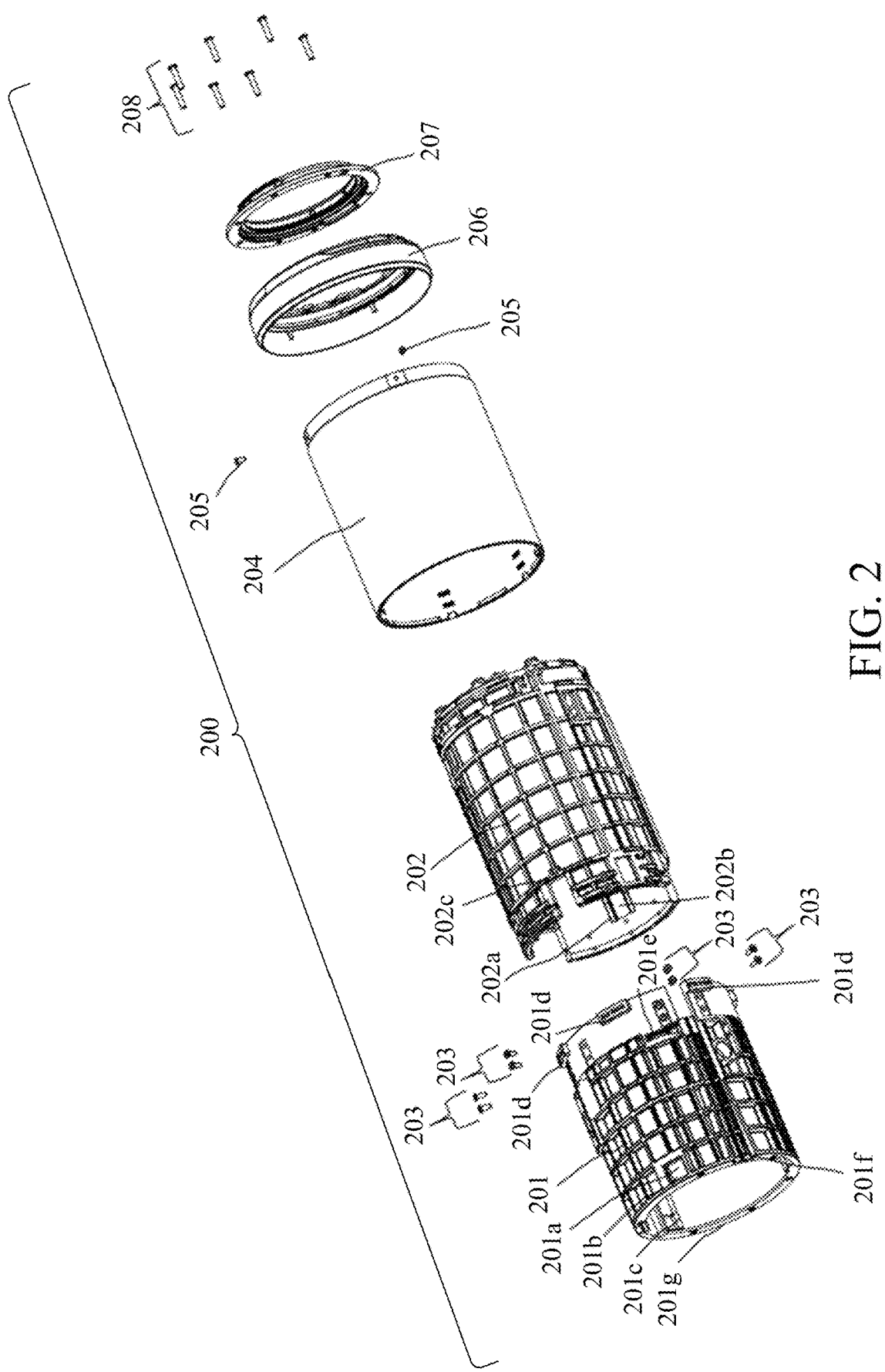
FIG. 2 is an exploded perspective view of a fixed barrel unit in the lens apparatus according to the first embodiment.

FIG. 2 illustrates a structure of the fixed barrel unit 200 in the lens apparatus according to this embodiment. A first fixed barrel 201 has an assembly hole portion 201a used to incorporate the first guide roller 111 while the holding barrel unit 100 is incorporated inside the fixed barrel unit 200. The first fixed barrel 201 includes a contact portion (third contact portion) 201b which the first guide roller 111 contacts in the optical axis direction when the lens apparatus is in the imaging state described later, and a linear groove portion 201c that extends in the optical axis direction. By engaging the first guide roller 111 with the linear groove portion 201c, the movement of the holding barrel unit 100 in the optical axis direction is guided as described above.

The first fixed barrel 201 further includes a contact portion (second contact portion) 201d used to lock (or maintain) the lens apparatus in the imaging state, and a first groove portion 201e used to lock (or maintain) the lens apparatus in the retracted state described later. The contact portion 201d has a shape that tilts to the optical axis 400 (a plane orthogonal to the optical axis 400). The first groove portion 201e extends in the circumferential direction. The first fixed barrel 201 has a linear groove portion 201f that extends in the optical axis direction so as to enable the key 310 of the exterior barrel unit 300 described later to move in the optical axis direction between the imaging state and the retracted state.

The second fixing barrel 202 is fixed to the first fixing barrel 201 by screws 203. The second fixed barrel 202 has an engagement portion 202a that is radially engaged with the engagement portion 109d of the second holding barrel 109. The engagement portion 202a is always engaged with the engagement portion 109d when the holding barrel unit 100 moves relative to the fixed barrel unit 200 in the optical axis direction. The second fixed barrel 202 has linear groove portions 202b that extends in the optical axis direction. When the second guide rollers 120 are engaged with the linear groove portions 202b, the movement of the holding barrel unit 100 in the optical axis direction is guided. The second fixed barrel 202 has a contact portion (fourth contact portion) 202c which the first guide roller 111 contacts in the optical axis direction in the retracted state.

A second fixed barrel cover 204 is fixed to the second fixed barrel 202 with screws 205. A mount ring 206 and a mount 207 are fixed to the second fixing barrel 202 by screws 208. An unillustrated substrate is fixed to the second fixed barrel 202, and a lens controller, such as a CPU, mounted on the substrate communicates with an unillustrated camera via an unillustrated contact portion fixed to the mount 207.

Figure 3:
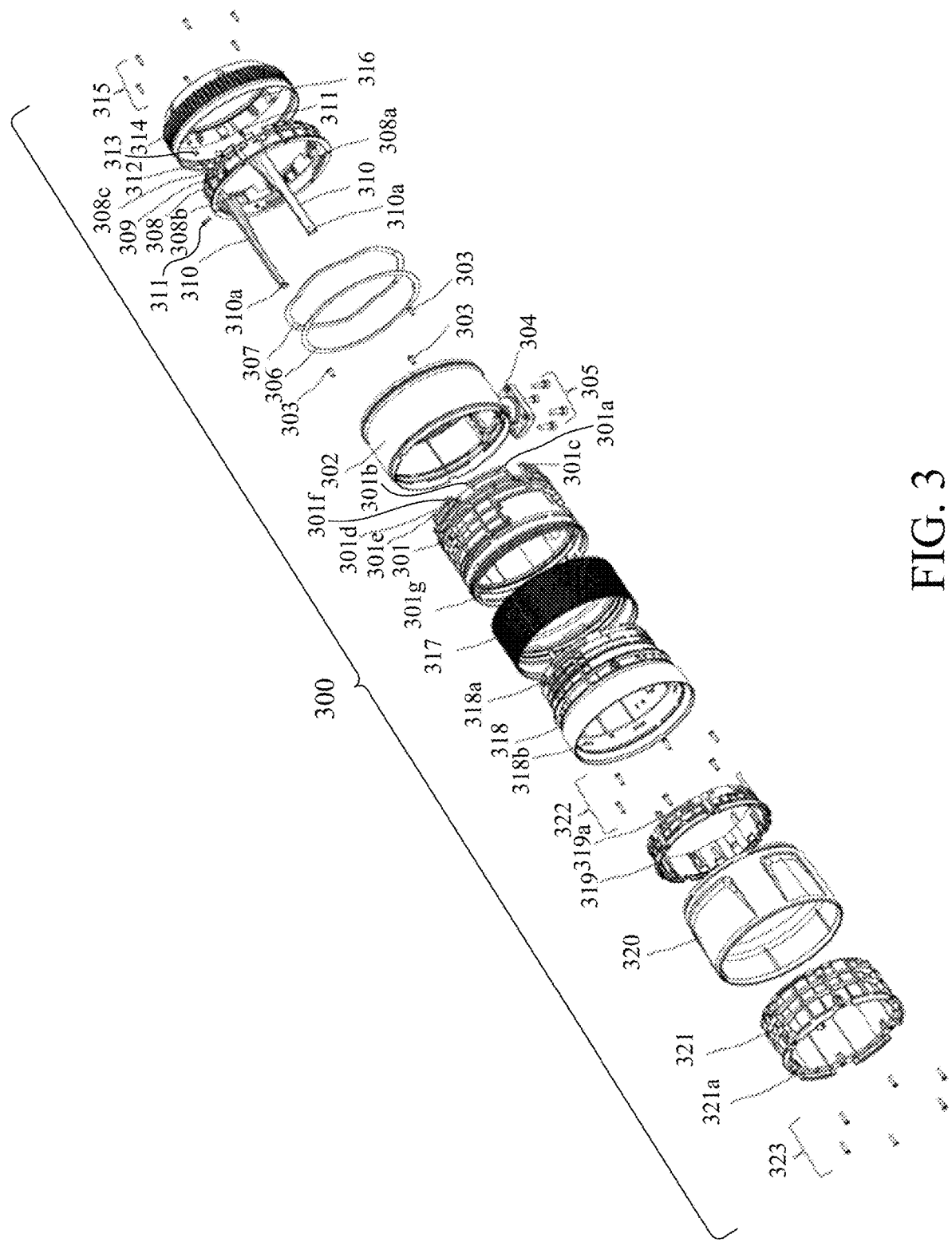
FIG. 3 is an exploded perspective view of an exterior barrel unit in the lens apparatus according to the first embodiment.

FIG. 3 illustrates a structure of the exterior barrel unit 300. The exterior barrel unit 300 includes a first exterior barrel 301 and a first exterior barrel cover 302. The first exterior barrel cover 302 is fixed to the first exterior barrel 301 with screws 303. A tripod seat 304 is fixed to the first exterior barrel cover 302 with screws 305.

A lock ring 308 is disposed on the image side of the exterior barrel unit 300, and can be rotated from an unlock position to a lock position that is located in the clockwise direction when viewed from the image side.

The lock ring 308 is rotatably held when its bayonet claw 308a is engaged with a bayonet groove 301a in the first exterior barrel 301. A rotation end of the lock ring 308 is restricted by the bayonet claw 308a and a first rotation end 301b in locking the imaging state and the retracted state. In unlocking the imaging state and the retracted state, the rotation end of the lock ring 308 is restricted by the screw 309 attached to the lock ring 308 and a second rotation end 301c after the lock ring 308 is incorporated into the first exterior barrel 301. The screw 309 is attached to the lock ring 308 after the lock ring 308 is incorporated into the first exterior barrel 301.

The first exterior barrel cover 302 and the lock ring 308 sandwich a thrust washer 306 and the wave washer 307. Thereby, a biasing force generated in the wave washer 307 biases the lock ring 308 to the image side (image sensor side of the camera) so as to eliminate the engagement play (backlash) between the bayonet claw 308a and the bayonet groove portion 301a in the optical axis direction. The lock ring 308 has a contact portion (first contact portion) 308b having a shape that tilts to the optical axis 400 (to a plane orthogonal to the optical axis 400), the contact portion 308b comes into contact with the contact portion (second contact portion) 201d of the first fixed barrel 201, and the lens apparatus is locked to the imaging state.

Two keys 310 are fixed to the lock ring 308 by screws 311. An operation member (lock member) includes the lock ring 308 and the key 310. The lens apparatus is locked to the retracted state when the connector 310a provided at the front end of the key 310 is inserted into and engaged with the first groove portion 201e provided in the first fixed barrel 201.

A click pin 312 as a contact member and a coil spring 313 as a biasing member are incorporated into a hole portion 308c provided in the lock ring 308, and sandwiched between a pin sliding surface 301d of the first exterior barrel 301 and a lock ring cover 314 fixed to the lock ring 308 by screws 315.

The first exterior barrel 301 has a first click groove portion 301e and a second click groove portion 301f. When the lock ring 308 is rotated from the unlock position to the lock position, the bayonet claw 308a of the lock ring 308 comes into contact with the first rotation end 301b of the first fixed barrel 301 and reaches the rotation end as described above. At this time, the click pin 312 is inserted into the first click groove portion 301e due to the biasing force of the coil spring 313, so that the user can get a feeling and recognize that the lock ring 308 has reached the lock position.

When the lock ring 308 is rotated from the lock position to the unlock position, the screw 309 attached to the lock ring 308 comes into contact with the second rotation end 301c of the first fixed barrel 301 and rotates as described above. At this time, when the click pin 312 is inserted into the second click groove portion 301f due to the biasing force of the coil spring 313, the user can get a feeling and recognize that the lock ring 308 has rotated to the unlock position.

The click pin and the coil spring may be provided to the first exterior barrel 301, and the first and second click grooves may be provided to the lock ring 308.

Telemp (Swaber) 316 is fixed to the lock ring cover 314 by adhesion. When the holding barrel unit 100 moves in the optical axis direction relative to the fixed barrel unit 200, the telemp 316 always contacts the second fixed barrel cover 204 with a biasing force in the radial direction.

The focus ring 317 is sandwiched between the first exterior barrel 301 and the second exterior barrel 318 and is held rotatably in the circumferential direction. The first exterior barrel 301 and the second exterior barrel 318 are fixed by adhesion while the bayonet claw 301g of the first exterior barrel 301 is engaged with the bayonet groove portion 318a of the second exterior barrel 318. A third exterior barrel 319, a third exterior barrel cover 320, and a fourth exterior barrel 321 are integrally fixed by screws 322, and the bayonet claw 318b of the second exterior barrel 318 is fixed to the second exterior barrel 318 by adhesion while it is engaged with the bayonet groove portion 319a in the third exterior barrel 319.

The exterior barrel unit 300 is integrally fixed to the holding barrel unit 100 by screws 323 while the connector 321a provided to the fourth exterior barrel 321 contacts the connector 101a provided to the first holding barrel 101. The integrated holding barrel unit 100 and exterior barrel unit 300 are movable between the imaging position at which they extend toward the object in the optical axis direction relative to the fixed barrel unit 200 and the stored position at which they are stored on the image side in the optical axis direction. The state in which the holding barrel unit 100 and the exterior barrel unit 300 are located at the imaging position is the imaging state of the lens apparatus, and the state in which the holding barrel unit 100 and the exterior barrel unit 300 are located at the retracted position is the retracted state of the lens apparatus.

Figure 4:
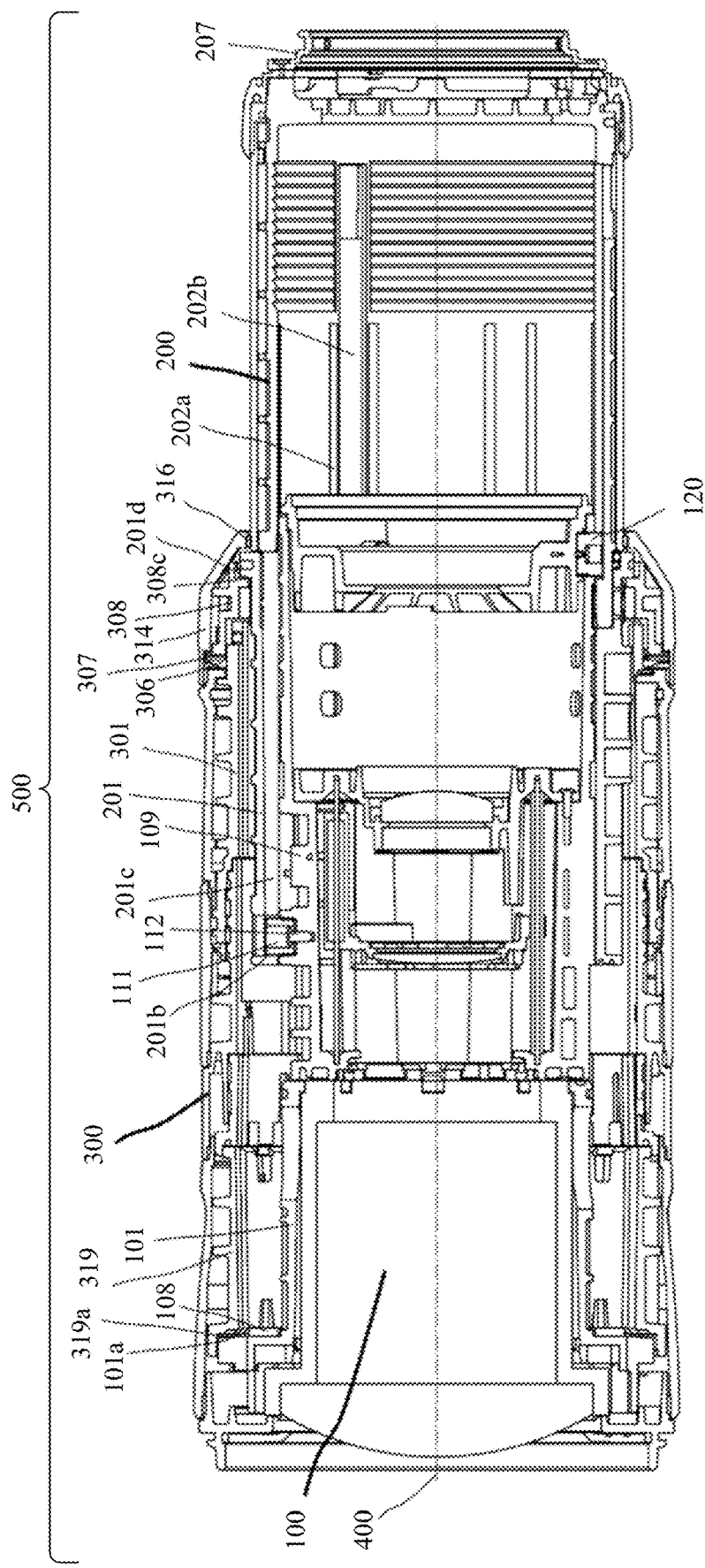
FIG. 4 is a sectional view of the lens apparatus (in an imaging state) according to the first embodiment.

FIG. 4 illustrates a section of the lens apparatus 500 according to this embodiment in an imaging state. The holding barrel unit 100 and the exterior barrel unit 300 are guided relative to the fixed barrel unit 200 in the optical axis direction by the engagements between the first guide roller 111 and the first linear groove portion 201c, and between the second guide roller 120 and the second linear groove portion 202b. As described above, the lock ring 308 is biased toward the image side by the engagement play between the bayonet claw 308a and the bayonet groove portion 301a by the biasing force of a wave washer 307.

When the holding barrel unit 100 and the exterior barrel unit 300 are extended to the imaging position relative to the fixed barrel unit 200 while the lock ring 308 is located at the unlock position, the first guide roller 111 contacts the contact portion 201b of the first fixed barrel 201. In this state, when the lock ring 308 is rotated from the unlock position to the lock position in the clockwise direction when viewed from the image side, the contact portion 308b of the lock ring 308 and the contact portion 201d of the first fixed barrel 201 come into contact with each other. As described above, since the contact portions 308b and 201d each have a shape that tilts to the optical axis 400 (to a plane orthogonal to the optical axis 400), a pushing force is generated that pushes the holding barrel unit 100 and the exterior barrel unit 300 toward the object side, and the first guide roller 111 comes into contact with the contact portion 201b without play. Thereby, the lens apparatus 500 can be locked in the imaging state without play.

Figure 5A:
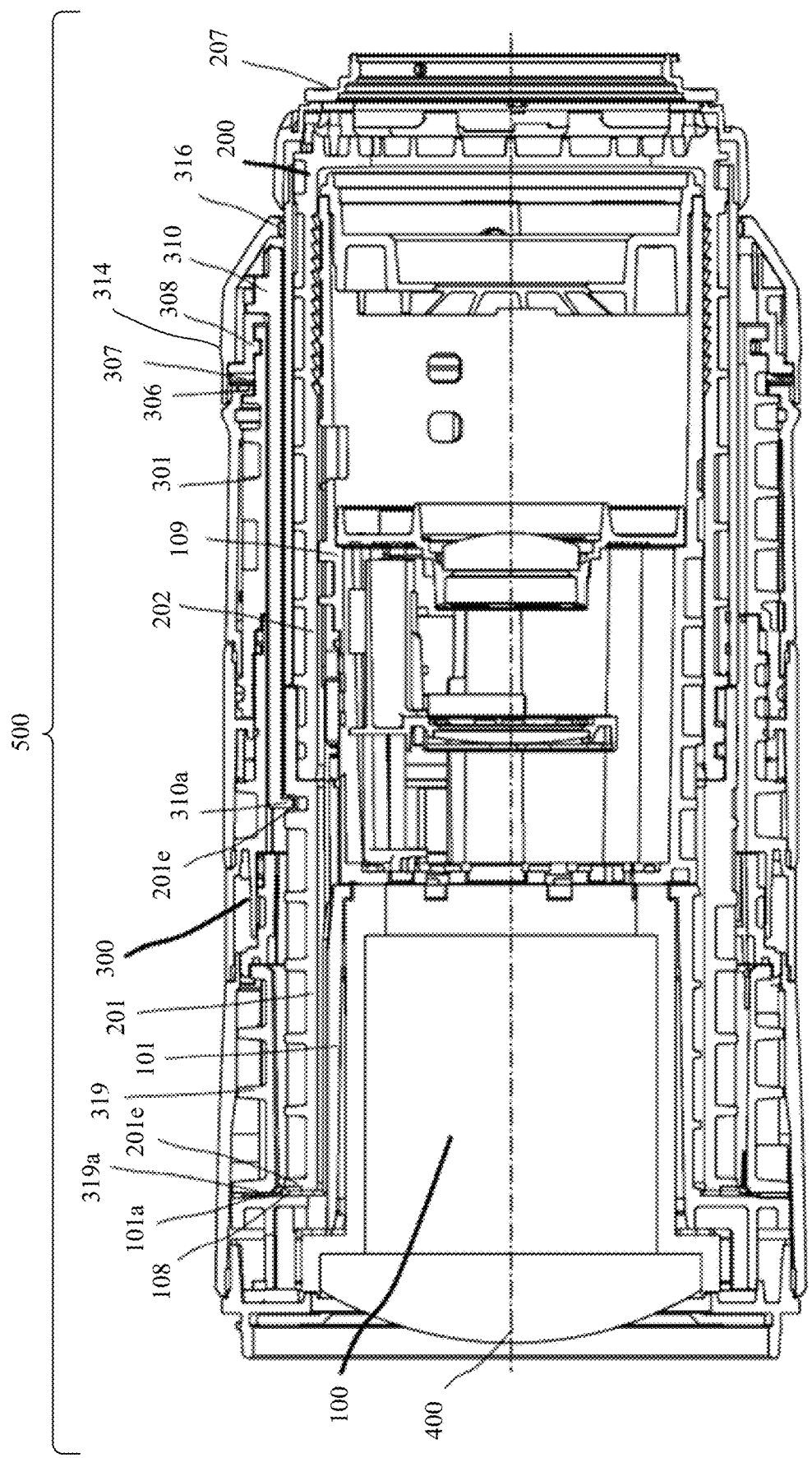
FIGS. 5A and 5B is a sectional view of the lens apparatus (in a retracted state) according to the first embodiment.

FIG. 5A illustrates a section of the lens apparatus 500 in the retracted state. This section is a section having a phase different from that of FIG. 4. In order to change the lens apparatus 500 from the imaging state to the retracted state, the lock ring 308 located at the lock position is rotated to the unlock position in the counterclockwise direction when viewed from the image side to unlock the imaging state. While the lock ring 308 is located at the unlock position, the holding barrel unit 100 and the exterior barrel unit 300 can be moved toward the image side relative to the fixed barrel unit 200 to shorten the overall length of the lens apparatus 500. When the holding barrel unit 100 and the exterior barrel unit 300 are moved relative to the fixed barrel unit 200, the key 310 fixed to the lock ring 308 passes through the linear groove portion 201f of the first fixed barrel 201.

Figure 5B:
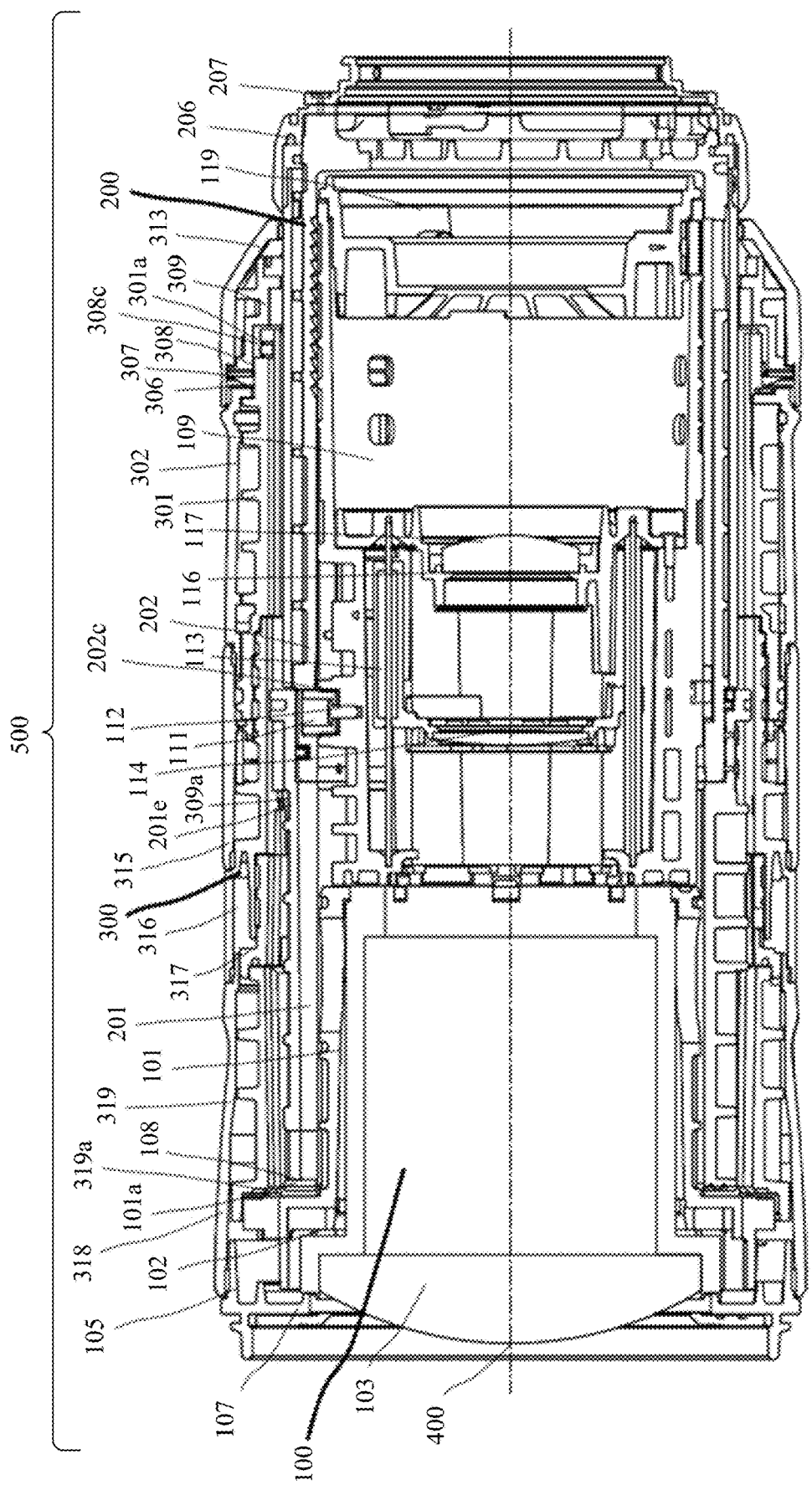

In the retracted state, as illustrated in FIG. 5B, the first guide roller 111 contacts the contact portion 202c of the second fixed barrel 202. At this time, when the rubber 108 attached to the first holding barrel 101 comes into contact with the linear groove portion 201f of the first fixed barrel 201, an impact when the holding barrel unit 100 and the exterior barrel unit 300 reach the stored position is mitigated.

In this state, when the lock ring 308 is rotated from the unlock position to the lock position in the clockwise direction when viewed from the image side, the connector 310a of the key 310 is inserted into and engaged with the first groove portion 201e of the first fixed barrel 201 as described above. Thereby, the lens apparatus can be held in the retracted state without play.

As described above, in this embodiment, the holding barrel unit 100 and the exterior barrel unit 300 are retractable (movable) relative to the fixed barrel unit 200 while the operation member (lock ring 308 and key 310) is located at the unlock position around the optical axis, and when the operation member rotated from the unlock position to the lock position in the extended imaging state is engaged with the fixed barrel unit 200, the imaging state is locked. In the shortened retracted state, when the operation member rotated from the unlock position to the lock position is engaged with the fixed barrel unit 200, the retracted state is locked. Therefore, according to this embodiment, the lens apparatus 500 can be locked to the imaging state or the retracted state, or unlocked from it by a simple operation (same operation) of rotating the operation member, and the operability of the lens apparatus 500 can be improved.

In this embodiment, the lens apparatus 500 is locked to the imaging state and the retracted state with the contact portion 308b provided to the lock ring 308 and the key 310 fixed to the lock ring 308, so that the member that holds these states does not expose to the appearance of the lens apparatus 500. Hence, the appearance quality of the lens apparatus 500 is improved, and an increase of the outer diameter of the lens apparatus 500 can be suppressed.

In this embodiment, the holding barrel unit 100 that holds all of the first barrel 103, the second barrel 114, and the third barrel 117 relating to the optical performance is movable in the optical axis direction and configured to switch between the imaging state and the retracted state. Therefore, particularly a super-telephoto lens is likely to secure a higher optical performance than that of a configuration that divides the optical system into a front unit and a rear unit and move them relative to each other.

Second Embodiment

Figure 6:
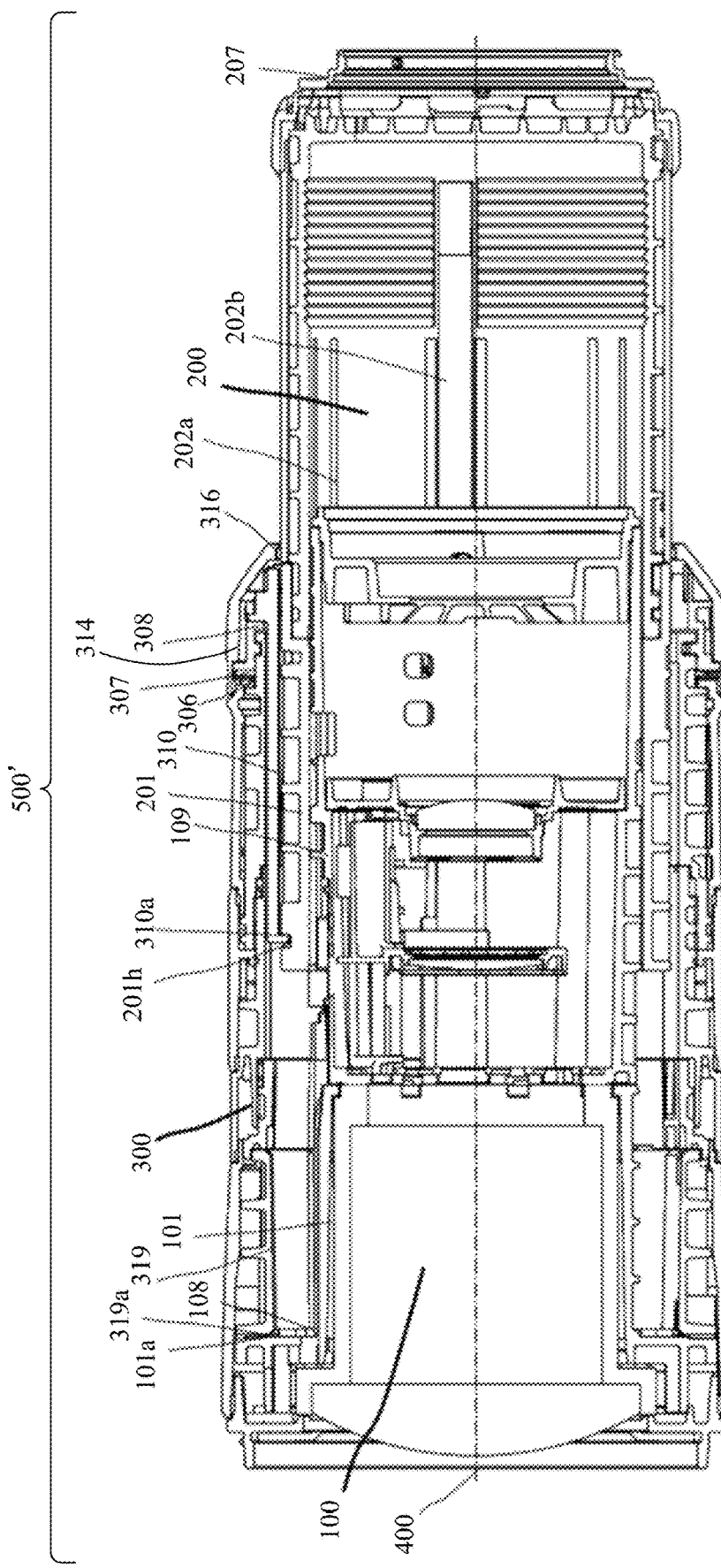
FIG. 6 is a sectional view of a lens apparatus (in an imaging state) according to a second embodiment of the present invention.

FIG. 6 illustrates a section of a lens apparatus 500' in an imaging state according to a second embodiment of the present invention. This section has the same phase as that of FIGS. 5A and 5B. In this embodiment, only differences from the first embodiment will be described.

In this embodiment, the state is locked by the key 310 fixed to the lock ring 308 in both the imaging state and the retracted state. That is, when the lock ring 308 is rotated from the unlock position to the lock position, the connector 310a of the key 310 is inserted into and engaged with the second groove portion 201h provided so as to extend in the circumferential direction in the first fixed barrel 201.

Since the connector 310a and the second groove portion 201h each have a shape that tilts to the optical axis 400 (to the plane orthogonal to the optical axis 400), a pushing force is generated which pushes the holding barrel unit 100 and the exterior barrel unit 300 toward the object side. Thereby, the first guide roller 111 contacts the contact portion 201*b* without play, and the imaging state is locked without play. The lock of the retracted state is the same as that in the first embodiment.

The above embodiment can provide a compact lens apparatus that can be locked to the imaging state and the retracted state by the same simple operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-059996, filed on Mar. 30, 2020 which is hereby incorporated by reference herein in its entirety.

What is claimed is:

1. A lens apparatus comprising:
a holding barrel configured to hold a lens;
an operation member;
an exterior barrel configured to hold the operation member rotatably around an optical axis; and
a fixed barrel,
wherein the holding barrel is integrally fixed to the exterior barrel, and when the holding barrel and the exterior barrel move in an optical axis direction relative to the fixed barrel, an imaging state and a retracted state in which an overall length is shorter than that of the imaging state are switchable,
wherein when the operation member is rotated in one direction around the optical axis in the imaging state, the operation member gets engaged with the fixed barrel and the imaging state gets locked,
wherein when the operation member is rotated in the one direction around the optical axis in the retracted state, the operation member gets engaged with the fixed barrel and the retracted state gets locked, and
wherein when the operation member is rotated in the other direction around the optical axis, the operation member gets disengaged from the fixed barrel, and the imaging state or the retracted state gets unlocked and switchable.

2. The lens apparatus according to claim 1, wherein an engagement portion between the operation member and the fixed barrel in the imaging state is different from an engagement portion between the operation member and the fixed barrel in the retracted state.

3. The lens apparatus according to claim 1, wherein the operation member includes a first contact portion and a connector,
wherein the fixed barrel includes a second contact portion and a first groove portion,
wherein when the operation member is rotated in the one direction in the imaging state, the first contact portion and the second contact portion come into contact with each other and the imaging state gets locked, and
wherein when the operation member is rotated in the one direction in the retracted state, the connector gets engaged with the first groove portion and the retracted state gets locked.

4. The lens apparatus according to claim 3, wherein the first contact portion and the first groove portion are formed so as to be covered by the exterior barrel in the imaging state.

5. The lens apparatus according to claim 1, wherein the holding barrel includes a cam follower,
wherein the operation member includes a first contact portion,
wherein the fixed barrel includes a second contact portion and a third contact portion, and
wherein when the cam follower and the third contact portion come into contact with each other in the imaging state and the operation member is rotated in the one direction, the operation member gets engaged with the fixed barrel and the imaging state gets locked.

6. The lens apparatus according to claim 5, wherein at least one of the first contact portion and the second contact portion tilts to a plane orthogonal to the optical axis.

7. The lens apparatus according to claim 1, wherein the holding barrel includes a cam follower,
wherein the fixed barrel includes a fourth contact portion and a third contact portion, and
wherein when the cam follower and the fourth contact portion come into contact with each other in the retracted state.

8. The lens apparatus according to claim 1, wherein the operation member includes a connector,
wherein the fixed barrel includes a first groove portion and a second groove portion,
wherein when the operation member is rotated in the one direction in the imaging state, the connector gets engaged with the second groove portion and the imaging state gets locked, and
wherein when the operation member is rotated in the retracted state, the connector gets engaged with the first groove portion and the retracted state gets locked.

9. The lens apparatus according to claim 1, wherein one of the operation member and the exterior barrel includes a contact member and a biasing member,
wherein the other of the operation member and the exterior barrel includes a first click groove portion and a second click groove portion,
wherein when the operation member is rotated in the one direction, the contact member gets engaged with the first click groove portion while the imaging state or the retracted state is locked, and
wherein when the operation member is rotated in the other direction, the contact member gets engaged with the second click groove portion while the imaging state or the retracted state is unlocked.

10. The lens apparatus according to claim 8, wherein at least one of the connector and the second groove portion tilts to a plane orthogonal to the optical axis.

11. The lens apparatus according to claim 1, wherein the operation member is disposed closest to an image plane in the exterior barrel.

12. The lens apparatus according to claim 1, wherein the lens apparatus is detachably or integrally attached to an image pickup apparatus.

* * * * *